United States Patent [19]

Nakamura et al.

[11] Patent Number: 5,582,885
[45] Date of Patent: Dec. 10, 1996

[54] SILICONE RUBBER ROLL

[75] Inventors: Tsutomu Nakamura; Satao Hirabayashi, both of Annaka, Japan

[73] Assignee: Shin-Etsu Chemical Co., Ltd., Tokyo, Japan

[21] Appl. No.: 247,190

[22] Filed: May 20, 1994

[30] Foreign Application Priority Data

May 20, 1993 [JP] Japan .................................. 5-141321

[51] Int. Cl.$^6$ .................................. B32B 1/08; B25F 1/00
[52] U.S. Cl. .................... 428/35.8; 428/36.92; 428/447; 492/59; 492/58; 492/54; 492/56; 492/53
[58] Field of Search .................................. 492/59, 58, 54, 492/56, 53; 428/36.92, 35.8, 447

[56] References Cited

U.S. PATENT DOCUMENTS

| | | | |
|---|---|---|---|
| 4,603,087 | 7/1986 | Ema et al. | 428/447 |
| 4,761,454 | 8/1988 | Oba et al. | 524/862 |
| 4,977,308 | 12/1990 | Soga | 219/469 |

OTHER PUBLICATIONS

English Abstract of JP 61158362.

*Primary Examiner*—John C. Bleutoe
*Assistant Examiner*—Karen A. Dean
*Attorney, Agent, or Firm*—Millen, White, Zelano & Branigan, P.C.

[57] ABSTRACT

A silicone rubber roll is characteristically prepared on a metallic center by forming a layer of the cured product of a silicone rubber composition which comprises (A) organopolysiloxane, in which the total amount of low molecular weight siloxanes having a degree of polymerization ranging from 3 to 20 is controlled to be at most 10,000 ppm, (B) reinforcing silica powder with a specific surface area of at least 50 m$^2$/g, (C) silicone elastomer particles with an average particle size of 200 μm, in which the total amount of low molecular weight siloxanes having a degree of polymerization ranging from 3 to 20 is 2,000 ppm or less, and (D) a curing agent. The total amount of low molecular weight siloxanes having a degree of polymerization ranging from 3 to 20 within the cured product layer is controlled to be 2,000 ppm or less, since the elimination of the low molecular weight siloxanes having a degree of polymerization ranging from 3 to 20 proceeds effectively during the processes of the silicone rubber composition preparation, forming, and curing. Therefore, the obtained roll is extremely useful for various types of rolls utilized in copying machines which particularly need to avoid the low molecular weight siloxanes.

18 Claims, No Drawings

SILICONE RUBBER ROLL

This invention relates to a silicone rubber roll in which the content of the low molecular weight siloxanes having a degree of polymerization ranging from 3 to 20 is suppressed.

In this specification, the "degree of polymerization" indicates the number of the repeated siloxane units (—SiO).

BACKGROUND OF THE INVENTION

Conventionally, silicone rubbers are superior in heat resistance, cold resistance, and weather resistance, therefore they are being utilized in various fields. However, low molecular weight siloxanes are undesirable for parts which are exposed to electrical contact or that are utilized in the vicinity thereof, or for the parts of office automation (OA) instruments such as copiers, facsimile machines and personal computers, particularly such as for roll materials in a copying machine. Therefore silicone rubbers for these purposes are desired to have a reduced content of low molecular weight siloxanes. This is because the low molecular weight siloxanes in silicone rubber tend to cause troubles such as improper contact and unclear images.

The conventional countermeasures for this problem are: the utilization of an organopolysiloxane, from which the low molecular weight siloxane components have been removed by reduced pressure stripping, as a base component of the silicone rubber, and the application of a long post-curing process to the cured silicone rubber in order to volatilize the low molecular weight siloxanes from the cured product.

However, the following problems are still noticed. The reduced pressure stripping may easily remove the low molecular weight siloxane components existing in the organopolysiloxane which have a low degree of polymerization, but does not remove the components existing in the organopolysiloxane with a relatively high degree of polymerization. In addition, the application of a long post-cure process is extremely disadvantageous from the industrial view point. Therefore, neither method is a conclusive solution.

Further, addition of a large amount of sellaite powder, reinforcing filler, or spherical silica powder may relatively reduce the content of the low molecular weight siloxane components. In this case, however, the rubber hardness increases and other critical disadvantages occur, such as a loss of the rubber elasticity characteristic of the silicone rubber, and a loss of heat resistance and weather resistance.

Therefore, an object of this invention is to provide a silicone rubber roll wherein the content of the low molecular weight siloxanes is suppressed.

Upon further study of the specification and appended claims, further objects and advantages of this invention will become apparent to those skilled in the art.

SUMMARY OF THE INVENTION

According to this invention, the silicone rubber roll is characteristically prepared on a metallic center by forming thereon a layer of the cured product of the silicone rubber composition comprising:

(A) an organopolysiloxane expressed by the average formula (1) below:

$$R^1{}_n SiO_{(4-n)/2} \tag{1}$$

wherein $R^1$ is an unsubstituted or substituted monovalent hydrocarbon group, $R^1$ may be the same or different, and n is a number ranging from 1.98 to 2.02, and in which the total amount of the low molecular weight siloxanes having a degree of polymerization from 3 to 20 is controlled to be 10,000 ppm or less, (B) reinforcing silica powder having a specific surface area of at least 50 m²/g, (C) silicone elastomer particles with an average particle size of 200 μm or less, in which the total amount of the low molecular weight siloxanes having a degree of polymerization from 3 to 20 is 2,000 ppm or less, and (D) a curing agent.

An important characteristic of this invention is the blending in the silicone rubber composition of the silicone elastomer particles, which have a small amount of the low molecular weight siloxanes, in order to form the cured product. The silicone elastomer particles expel the low molecular weight siloxanes more easily than the (A) component, organopolysiloxane. An addition of the silicone elastomer particles, even in a large amount, will neither increase the hardness of the cured product nor diminish the desired characteristics of the silicone rubbers.

Silicone rubber composition

In this invention, the silicone rubber composition used to form the cured layer for the roll comprises the following components.

Component (A):

Component (A) is the base composition containing the organopolysiloxane expressed by the average formula (1). In this average formula, $R^1$ is an unsubstituted or substituted monovalent hydrocarbon group, $R^1$ may be the same or different. Particular examples are: alkyl groups such as a methyl group, ethyl group, propyl group, and butyl group; cycloalkyl groups such as a cyclohexyl group; alkenyl groups such as a vinyl group, an allyl group, a butenyl group and a hexenyl group; aryl groups such as a phenyl group and a tolyl group; aralkyl groups such as a benzyl group and a phenyl ethyl group; and these groups in which a part, or all, of the hydrogen atoms are substituted by halogen atoms or cyano groups, such as a chloromethyl group, a trifluoropropyl group and a cyanoethyl group. Among these, those with 1 to 10 carbon atoms, particularly 1 to 8 carbon atoms are desirable in this invention. Preferably, the organopolysiloxane contains 0.001 to 5 mol % of alkenyl groups. The number n ranges from 1.98 to 2.02.

For the organopolysiloxane expressed by this average formula, a linear type is generally preferred, but a branched type may be employed. A mixture of two or more types with different molecular structures may also be utilized. Further, said organopolysiloxane is preferred to possess an average degree of polymerization of at least 3,000, particularly from 3,000 to 10,000, more particularly from 5,000 to 10,000.

It is necessary that the organopolysiloxane is controlled to have at most 10,000 ppm, preferably less than 8,000 ppm, low molecular weight siloxanes having a degree of polymerization of from 3 to 20. The degree of polymerization is the number of repeated siloxane (—SiO—) units. When more than 10,000 ppm of such low molecular weight siloxanes exist, it becomes difficult to reduce the amount of the low molecular weight siloxanes within the cured product. The control of the low molecular weight siloxane contents at this level may be carried out sufficiently by reduced pressure stripping, as described above, or by other conventional methods. However, using the other conventional methods it is difficult to reduce low molecular weight siloxanes of component A, especially those with 10 or more, particularly 10–20, $R_2SiO$ units, where R is alkyl, when the degree of polymerization is high, such as 3,000 or more. Base polymers of 3–10 $R_2SiO$ units are more readily removed by such methods.

Component (B):

The reinforcing silica powder, component (B), is essential for the preparation of the silicone rubber cured product with a superior mechanical strength. For this purpose, it must possess a specific surface area of at least 50 $m^2/g$, more desirably in the range from 100 to 300 $m^2/g$. A specific surface area less than 50 $m^2/g$ will reduce the mechanical strength of the cured product. Examples of the reinforcing silica are fumed silica, precipitated silica, and hydrophobically treated silica by surface-treatment of the above silicas with chlorosilane, alkoxysilane or silazane.

Further, the reinforcing silica powder is desirably used in a ratio of 5 to 80 parts by weight, preferably 10 to 50 parts by weight, based on 100 parts by weight of the component (A), organopolysiloxane. Less than 5 parts by weight will not achieve the intended reinforcing effect and more than 80 parts by weight tends to hinder the forming property and to impair the mechanical strength of the obtained cured rubber layer.

Component (C):

The silicone elastomer particles, component (C), are present to reduce the amount of the low molecular weight siloxanes within the composition, as described above. In addition, the elastomer particles improve the forming property of the composition and the rubber elasticity of the cured layer at the same time.

In this invention, the silicone elastomer particles should contain at most 2,000 ppm, more desirably at most 1,500 ppm, of the low molecular weight siloxanes having a degree of polymerization from 3 to 20. In addition, the average particle size should be at most 200 μm, more desirably from 0.5 to 50 μm. When elastomer particles containing more than 2,000 ppm of the low molecular weight siloxanes are used, the effectiveness to reduce the amount of the low molecular weight siloxanes within the composition becomes low. Further, the utilization of particles with an average particle size of more than 200 μm will impair the mechanical strength of the prepared cured layer.

Examples of the silicone elastomer particles are gel particles and spherical particles obtained by the curing of siloxane having vinyl groups by utilizing organic hydrogen siloxane having SiH groups and platinum, or platinum group metal, catalysts.

For such elastomer particles prepared according to this method, the siloxanes having vinyl groups are those expressed, for example, by the following general formula (2):

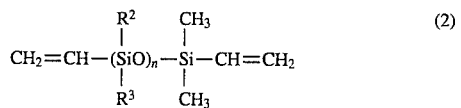

wherein $R^2$ and $R^3$ are substituted or unsubstituted monovalent hydrocarbon groups, which may be the same or different and n is a positive integer, preferably from 1 to 1,000, particularly from 50 to 500. Particular examples of $R^2$ and $R^3$ are the same groups listed for $R^1$ in the general formula (1). $R^2$ and $R^3$ are, preferably, methyl or vinyl groups.

The organohydrogen siloxane utilized along with the siloxane having vinyl groups possesses at least two hydrogen atoms bound to silicon atoms within one molecule. Its molecular structure may be linear, branched, or cyclic, however, the degree of polymerization is desirably at most 300. Examples are: diorganopolysiloxane with terminals blocked by dimethyl hydrogen groups, co-polymers of dimethyl siloxane with methyl hydrogen siloxane units and terminal trimethyl siloxyl units, a low viscosity fluid comprising dimethyl hydrogen siloxane units [$H(CH_3)_2$ $SiO0.5$ units] and $SiO_2$ units, 1,3,5,7-tetrahydrogen-1,3,5,7-tetramethyl cyclotetrasiloxane, 1-propyl-3,5,7-trihydrogen-1,3,5, 7-tetramethyl cyclotetrasiloxane, and 1,5-dihydrogen-3,7-dihexyl-1, 3,5,7-tetramethyl cyclotetrasiloxane. These hydrogen siloxanes are utilized in amounts to provide 0.5 to 5 mole of SiH groups to one mole of vinyl group in the siloxanes having vinyl groups.

Platinum or platinum group metal compounds are utilized as a curing catalyst for the reaction between the siloxanes having vinyl groups and the organohydrogen siloxanes. The types and amounts will be described later in the section on the curing agent (D).

The most preferred silicone elastomer particles are spherical particles obtained by the emulsion polymerization, in the presence of platinum type catalysts, of silicone oil having vinyl groups and silicone oil having organohydrogen siloxane, each of which had the low molecular weight siloxanes eliminated by reduced pressure stripping as much as possible.

The silicone elastomer particles are desirably used in a ratio of 50 to 300 parts by weight, more preferably 80 to 250 parts by weight, based on 100 parts by weight of component (A). Less than 50 parts by weight may not show the intended reduction effect of the low molecular weight siloxanes, while more than 300 parts by weight will hinder the compatibility, and the elastomer particles may not be dispersed in the composition uniformly. However, when the uniform dispersion is difficult, oil with a low degree of polymerization (average degree of polymerization of 200 to 1.000), selected from the group of the organopolysiloxanes, component (A), may be added in a suitable amount to aid compatibility. The content of low molecular weight siloxanes having a degree of polymerization ranging from 3 to 20 is, preferably, controlled to be 2,000 ppm or less in this oil.

Component Agent (D):

The curing agent, component (D), may be selected from conventional types, depending upon the cross-linking reaction mechanisms of the silicone rubber composition.

For example, when the cross-linking reaction takes place among organopolysiloxanes, organic peroxides are used as a curing agent. Examples of the organic peroxides are: benzoyl peroxide, 2,4-dichlorobenzoyl peroxide, p-methyl benzoyl peroxide, 2,4-dicumyl peroxide, 2,5-dimethyl-bis(2,5-t-butyl peroxy) hexane, di-butyl peroxide, and t-butyl perbenzoate. These organic peroxides are added at the ratio of 0.5 to 5 parts by weight based on 100 parts by weight of component (A), organopolysiloxane, or 0.1 to 1.0% by weight of the total silicone rubber composition.

When the (A) component, organopolysiloxane, possesses an alkenyl group bound to a silicon atom, an organohydrogen polysiloxane, which contains at least two hydrogen atoms within a molecule directly bound to silicon atoms, may be utilized as a curing agent. In this case, the alkenyl group within the organopolysiloxane (A) and SiH groups in the organohydrogen polysiloxane undergo crosslinking through the addition reaction and form the cured product. The organohydrogen polysiloxane used here may be linear, branched or cyclic, however, its degree of polymerization is, preferably, at most 300. Adequate examples are listed below, but are not limited to those.

They are: diorganopolysiloxane with terminals blocked by dimethyl hydrogen silyl groups, co-polymer of dimethyl siloxane units with methyl hydrogen siloxane units and terminal trimethyl siloxyl units, a low viscosity fluid comprising dimethyl hydrogen siloxane units [H(CH$_3$)$_2$SiO$_{0.5}$ units], 1,3,5,7-tetrahydrogen-1,3,5,7-tetramethyl cyclotetrasiloxane, 1-propyl-3,5,7-trihydrogen-1,3,5,7-tetramethyl cyclotetrasiloxane, and 1,5-dihydrogen-3,7-dihexyl-1,3,5,7-tetramethyl cyclotetrasiloxane.

These organohydrogen polysiloxanes as curing agents are utilized in such an amount to provide 50 to 500 mol % of hydrogen atoms, which are directly bound to silicon atoms, based on the alkenyl group in the (A) component.

Further, in this embodiment, utilization of addition reaction catalysts is desirable. The addition reaction catalysts themselves are well known and they are, in general, platinum or platinum group compounds. Suitable examples are platinum black, chloroplatinic acid, alcohol denatured chloroplatinic acid, and complexes of chloroplatinic acid with olefins, aldehydes, vinyl siloxanes, acetylene alcohols, and ethers. The amount of such catalysts are desirably in the range from 1 to 2,000 ppm of platinum atom equivalent based on component (A), organopolysiloxane.

Other Components.

Other components may be added to the silicone rubber composition utilized in this invention as necessary, in addition to the components (A) through (D), as long as they will not interfere with the effect of this invention. Such additives are fillers as bulking agents such as crushed quartz and calcium carbonate, organic or inorganic foaming agents, in order to form a sponge, such as azo bis(butyronitrile), dinitropentamethylene tetramine, and benzenesulfonyl hydrazide, coloring agents, heat resistance enhancers, reaction controllers, mold releasing agents, and dispersion agents for the filler. Among these, the foaming agents are desirably utilized at the ratio of 3 to 10 weight based on the total silicone rubber composition. Examples for the dispersion agents for the fillers are diphenyl silanediol, various alkoxyl silanes, carbon functional silanes, and low molecular weight siloxanes having silanol groups. However, these may particularly impair the effect of this invention, therefore their use must remain at a minimum.

Known additives may also be added to the silicone rubber composition of this invention in order to provide nonflammability and fire resistance. Such known additives are platinum containing materials, platinum compounds and titanium dioxide, platinum and r-Fe$_2$O$_3$, platinum and manganese carbonate, ferrite, mica, glass fiber, and glass flake. Further, the following substances may be added to the silicone rubber composition of this invention in order to make it electroconductive: electroconductive carbon black such as acetylene black, conductive furnace black, and conductive channel black, electroconductive zinc white and electroconductive titanium oxide. These electroconductive materials may be used singly or in mixtures. When a single material is used, for, example, 3–50 parts by weight of electro-conductive carbon black is preferred, based on 100 parts by weight of component (A). When the material is electroconductive zinc white or electroconductive titanium oxide, 50–350 parts by weight is preferred.

Preparation of the silicone rubber composition:

The silicone rubber composition comprising said components is readily prepared by mixing all of the components uniformly by using rubber mixers such as double rollers, a Banbury mixer, or a dough mixer (kneader), and by applying heat treatment as necessary. In this case, a base compound may be prepared by first mixing, for example, organopolysiloxane, the (A) component, and the reinforcing silica, the (B) component, and then the (C) component (silicone elastomer particles) and the (D) component (curing agent) may be added and mixed to the base compound at the point of usage.

Silicone rubber rolls

The obtained silicone rubber composition is formed into a roll on a center, particularly a metal center, coated with an appropriate primer, by the various forming methods such as pressed molding and extrusion molding. After forming, the roll is usually cured at 100° to 400° C. for 1 minute to 5 hours, then post-cured at 200°–250° C. for 30 minutes to 24 hours, in order to form the silicone rubber cured layer.

In this invention, the content of the low molecular weight siloxanes having a degree of polymerization of 3 to 20 within the silicone rubber composition may be reduced to 4,000 ppm or less during the preparation process of the silicone rubber composition. A further post-cure process will eliminate the low molecular weight siloxanes even more effectively, for example, to an amount of 2,000 ppm or less.

Therefore, the silicone rubber rolls of this invention are effectively utilized for applications which need to avoid the low molecular weight siloxanes, such as roll materials utilized in various OA instruments, particularly roll materials in copying machines, such as electrostatic charge rolls, developing rolls, copying rolls, paper feed rolls, fixing rolls, pressurizing rolls, discharging rolls, and cleaning rolls.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding Japanese Application No. 5-141321, filed May 20, 1993, are hereby incorporated by reference.

EXAMPLES

In the examples below, ΣD3–D20 indicates the amount of siloxanes with polymerization from 3 to 20, and "parts" means "parts by weight", unless otherwise specified.

Preparation Example 1

An organopolysiloxane composition having a molar ratio (≡SiH/Si—CH=CH$_2$) of 2 (two) was prepared by:

adding 10 parts by weight of methylhydrogen polysiloxane (28 cSt at 25° C.), both molecular ends being terminated with trimethylsilyl groups, and consisting of 95 mol % of methylhydrogen siloxane units, and 5 mol % of dimethyl siloxane units, to 100 parts by weight of methylvinyl polysiloxane (200 cSt at 25° C.), both molecular ends being terminated with dimethylvinyl silyl groups, and consisting of 96 mol % of dimethyl siloxane units, and 4 mol % of methylvinyl siloxane units, an emulsion was prepared by adding 3 parts by weight of polyoxyethylene octylphenyl ether (H.L.B.=13.5), and 587 parts by weight of water to the above organopolysiloxane composition, mixing uniformly by homogenizer, and homogenizing by gaulin-homogenizer at 300 kg/cm$^2$. According to the above process, in the prepared emulsion, the maximum diameter of particles was 10 μm, and the average diameter in volume of particles was 1.0 μm.

Then, to 0.5 parts by weight of the emulsion, 0.06 parts by weight as the platinum amount of a complex of chloroplatinic acid with olefins was added for making a platinum-containing emulsion.

This platinum-containing emulsion was added and mixed with the remaining emulsion, and left for 20 hours at 25° C. for reaction. The result in the average diameter in volume of particles was 1.0 μm.

After spray-drying the prepared emulsion by spray dryer (Inlet Temp=150° C., Outlet Temp.=80° C.), 102.5 parts by weight of spherical silicone elastomer particles were obtained (Yield: 94%, Diameters: 0.5–15 μm, ΣD$_{3-20}$=973 ppm).

Example 1

A base compound was prepared by mixing 100 parts of organopolysiloxane gum, prepared by reduced pressure stripping for 2 hours under 180° C./10mmHg, which comprises 99.825 mol % of dimethyl siloxane units, 0.15 mol % of methyl vinyl siloxane units, and 0.025 mol % of dimethyl vinyl siloxane, wherein the total content of the σD3–D20 low molecular weight siloxanes is 8,000 ppm and the average degree of polymerization is about 5,000, 3 parts of diphenyl silane diol (dispersion agent), 4 parts of dimethyl polysiloxane with terminal silanol groups (a degree of polymerization, n=10), and 40 parts of hydrophobic treated silica with a specific surface area of 200 m$^2$/g (manufactured by Nippon Aerosil), mixing by kneader, and then by heat treating for two hours at 165° C.

Into the 100 parts of the said base compound, 5 parts of the treated silica with specific surface area of 200 m$^2$/g (manufactured by Nippon Aerosil) and 130 parts of spherical silicone elastomer particles (prepared in Preparation Example 1), were added and mixed thoroughly by the method of a pressurized kneader. Further, 1.3 parts of 2,5-dimethyl-2,5-di(t-butyl peroxy) hexane is added to the mixture, then mixed to obtain a silicone rubber compound. The obtained compound was formed into a 20 mm diameter roll on a metal center coated with the primer No. 16 (manufactured by Shin-Etsu Chemical Co., Ltd.). The forming temperature was 165° C. (15 minutes), and the forming pressure was 70 kgf/cm$^2$. At this time, the total content of the σD3–D20 low molecular weight siloxanes in this compound was measured. Then this roll was post-cured at 200° C. for 4 hours, and the total content of the σD3–D20 low molecular weight siloxanes in the cured product was measured. Physical properties of the cured product were also measured and the results are shown in Table 1.

Comparison Example 1

A silicone rubber compound was prepared as described in Example 1, except that the silicone elastomer particles were not added. Preparation of a silicone rubber roll, measurements of the total content of the σD3–D20 low molecular weight siloxanes, and measurement of physical properties of the cured roll, were performed as in Example 1. The results are summarized in Table 1.

Comparison Example 2

Preparation of a silicone rubber roll, measurements of the total content of the σD3–D20 low molecular weight siloxanes, and measurement of physical properties of the cured roll, were performed as in Comparison Example 1, except the post-cure process took 20 hours. The results are summarized in Table 1.

Comparison Example 3

A silicone rubber compound was prepared as described in Example 1, except that the silicone elastomer particles were replaced by the same amount of quartz powder. Preparation of a silicone rubber roll, measurements of the total content of the σD3–D20 low molecular weight siloxanes, and measurement of physical properties of the cured roll, were also similarly performed. The results are summarized in Table 1.

Comparison Example 4

A silicone rubber compound was prepared as described in Example 1, except that the silicone elastomer particles were replaced by the same amount of spherical silicone resin particles (methylsilsesquioxane), prepared by hydrolysis of alkoxysilane, (X-52-590, manufactured by Shin-Etsu Chemical Co., Ltd.). The results are summarized in Table 1. Preparation of a silicone rubber roll, measurements of the total content of the σD3–D20 low molecular weight siloxanes, and measurement of physical properties of the cured roll, were also similarly performed. The results are summarized in Table 1.

TABLE 1

|  | Ex. 1 | C. Ex. 1 | C. Ex. 2 | C. Ex. 3 | C. Ex. 4 |
|---|---|---|---|---|---|
| Silicone Elastomer Particles | 130 parts | — | — | — | — |
| Silicone Resin Particles | — | — | — | — | 130 parts |
| Quartz Powder | — | — | — | 130 parts | — |
| Lower Molecular Weight Siloxane |  |  |  |  |  |
| In Compound (ppm) | 3430 | 7400 | 7400 | 7400 | 3970 |
| After Post-cure (ppm) | 1221 | 3450 | 2500 | 1500 | 1450 |
| Physical Properties (Cured Product) |  |  |  |  |  |
| Hardness (JIS/A) | 40 | 55 | 57 | 85 | 78 |
| Resilience (%) | 80 | 50 | 51 | 25 | 45 |

The duration of the post-cure process for Example 1 and Comparison Examples 1, 3 and 4 was 4 hours, while its duration was 20 hours for Comparison Example 2. Physical properties of the cured products were measured based on the JIS K 6301. The amount of the low molecular weight siloxanes is indicated by the ppm content of the total D3 to D20 per 1 gram of the material.

The results in Table 1 clarify that the silicone rubber roll obtained by this invention contains a much smaller amount of the low molecular weight siloxanes than those without silicone elastomer particles. Further, when resin-type silicone particles are used, the roll has disadvantageous hardness and resilience properties which make it unsuitable for the roll.

Example 2

A base compound was prepared by mixing, with a kneader, 100 parts of organopolysiloxane gum which comprises 99.825 mol % of dimethyl siloxane units, 0.15 mol % of methyl vinyl siloxane units, and 0.025 mol % of dimethyl vinyl siloxane, wherein the total content of the σD3–D20 low molecular weight siloxanes is 8,000 ppm and the average degree of polymerization is about 5,000, 1.5 parts of diphenyl silane diol (dispersion agent), 2 parts of dimethyl polysiloxane with terminal silanol groups (a degree of polymerization, n=10), and 20 parts of treated silica of with specific surface area of 200 m$^2$/g (manufactured by Nippon Aerosil), and then by treating for two hours at 165° C.

Into the 100 parts of said base compound 30 parts of acetylene black and 80 parts of spherical silicone elastomer particles (σD3–D20=973 ppm, particle size: 5 to 50 μm, manufactured by Shin-Etsu Chemical Co., Ltd., as X-52-874) were added and mixed thoroughly by a pressurized kneader. Further, 1.3 parts of 2,5-dimethyl-2,5-di(t-butyl peroxy) hexane is added to the mixture, then mixed to obtain a silicone rubber compound. The obtained composition was formed into a 20 mm diameter roll on a metal center coated with the primer No. 16 (manufactured by Shin-Etsu Chemical Co., Ltd.). The forming temperature was 165° C. (15 minutes) and the forming pressure was 70 kgf/cm². At this time, the total content of the σD3–D20 low molecular weight siloxanes in this compound was measured. Then this roll was post-cured at 200° C. for 4 hours and the total content of the σD3–D20 low molecular weight siloxanes in this compounds was measured. Then this roll was post-cured at 200° C. for 4 hours and the total content of the σD3–D20 low molecular weight siloxanes in the cured produce was measured. Physical properties of the cured product were also measured and the results are shown below:

Low Molecular Weight Siloxane

| In compound | 3250 ppm |
|---|---|
| After Post-Cure | 1250 ppm |

Physical Properties (Cured Product)

| Hardness (JIS/A) | 45 |
|---|---|
| Resilience (%) | 72 |

The silicone rubber roll of this invention offers an extremely reduced amount of the low molecular weight siloxanes therein having a degree of polymerization ranges from 3 to 20. Therefore, it is extremely useful as a roll part material in OA instruments for which, previously, its use was limited due to the effect of the low molecular weight siloxanes, particularly, it can be utilized as a roll in the vicinity of an exposure drum in copying machines.

What is claimed is:

1. A silicone rubber roll comprising a metallic center and a layer on the metallic center of the cured product of a silicone rubber composition which comprises:

(A) an organopolysiloxane expressed by the average formula (1) below:

$$R^1_n SiO_{(4-n)/2} \quad (1)$$

wherein $R^1$ is an unsubstituted or substituted monovalent hydrocarbon group, which may be the same or different, and n is a number ranging from 1.98 to 2.02, and in which the total amount of the low molecular weight siloxanes having a degree of polymerization from 3 to 20 is 10,000 ppm or less, (B) reinforcing silica powder having a specific surface area of at least 50 m²/g, (C) silicone elastomer particles with an average particle size of 200 μm or less, in which the total amount of the low molecular weight siloxanes having a degree of polymerization from 3 to 20 is 2,000 ppm or less, and (D) a curing agent.

2. The silicone rubber roll of claim 1, wherein the cured product of the silicone rubber composition has a total amount of low molecular weight siloxanes with a degree of polymerization from 3 to 20 from components (A) and (C) together of 2,000 ppm or less.

3. The silicone rubber roll of claim 1, wherein, in the organopolysiloxane (A), each $R^1$ is independently a monovalent hydrocarbon group of 1 to 10 carbon atoms, optionally substituted by halogen atoms or cyano groups.

4. The silicone rubber roll of claim 1, wherein, in the organopolysiloxane (A), each $R^1$ is independently an alkyl group, cycloalkyl group, alkenyl group, phenyl group, tolyl group, benzyl group or phenylethyl group of 1 to 10 carbon atoms, each optionally substituted with halogen atoms or cyano groups.

5. The silicone rubber roll of claim 1, wherein the organopolysiloxane (A) has an average degree of polymerization of 3,000 to 10,000.

6. The silicone rubber roll of claim 1, wherein the reinforcing silica powder has a specific surface area of 100 to 300 m²/g.

7. The silicone rubber roll of claim 1, wherein the silicone elastomer particles (C) have an average particle size of 0.5 to 50 μm.

8. The silicone rubber roll of claim 1, wherein the silicone rubber composition comprises 5 to 80 parts by weight of the reinforcing silica powder (B), 50 to 300 parts by weight of the silicone elastomer particles (C), and a catalytically effective amount of curing agent (D), based on 100 parts by weight of the organopolysiloxane (A).

9. The silicone rubber roll of claim 1, wherein the silicone elastomer particles (C) are spherical particles obtained by the curing of a siloxane having vinyl groups by utilizing an organohydrogen siloxane having SiH groups and a platinum or platinum group metal catalyst.

10. The silicone rubber roll of claim 1, which is a fixing roll, pressurizing roll or paper feeding roll for a copying or facsimile machine.

11. The silicone rubber roll of claim 8, which is an electroconductive silicone rubber roll, wherein the silicone rubber composition further comprises at least one of (E) electroconductive carbon black, (F) electroconductive zinc white and (G) electroconductive titanium oxide.

12. The silicone rubber roll of claim 8, which is a developing silicone rubber roll, wherein the silicone rubber composition further comprises at least one of (E) 3–50 parts by weight of electroconductive carbon black, (F) 50–350 parts by weight of electroconductive zinc white and (G) 50–350 parts by weight of electroconductive titanium oxide, based on 100 parts by weight of the organopolysiloxane (A).

13. The silicone rubber roll of claim 8, which is a copying silicone rubber roll, wherein the silicone rubber composition further comprises at least one of (E) 3–50 parts by weight of electroconductive carbon black, (F) 50–350 parts by weight of electroconductive zinc white and (G) 50–350 parts by weight of electroconductive titanium oxide, based on 100 parts by weight of the organopolysiloxane (A).

14. The silicone rubber roll of claim 1, wherein the silicone elastomer particles (C) are gel particles or spherical particles obtained by the curing of a siloxane having vinyl groups by an organohydrogensiloxane having an SiH group with a platinum or platinum group metal catalyst.

15. The silicone rubber roll of claim 14, wherein the siloxane having vinyl groups is of the formula (2):

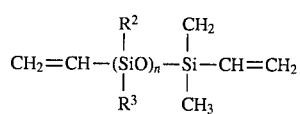

wherein $R^2$ and $R^3$ are substituted or unsubstituted monovalent hydrocarbon groups which may be the same or different and n is an integer of 1 to 1,000.

16. The silicone rubber of claim 15, wherein in formula (2) each $R^2$ and $R^3$ are independently an alkyl, cycloalkyl, alkenyl, phenyl, tolyl, benzyl or phenylethyl group of 1 to 10 carbon atoms optionally substituted with halogen atoms or cyano groups.

17. The silicone rubber roll of claim 14, wherein the organohydrogensiloxane has at least two hydrogen atoms bound to silicon atoms within a molecule and has a degree of polymerization of at most 300.

18. The silicone rubber roll of claim 1, wherein the silicone elastomer particles (C) are obtained by emulsion polymerization, in the presence of a platinum or platinum group metal catalyst, of a silicone oil containing vinyl groups and a silicone oil containing organohydrogensiloxane groups each of which have been subjected to reduced pressure stripping to eliminate low molecular weight siloxanes.

* * * * *